W. N. SPRINGER.
STEAM GANG PLOW.
APPLICATION FILED MAY 10, 1909.
982,448.
Patented Jan. 24, 1911.
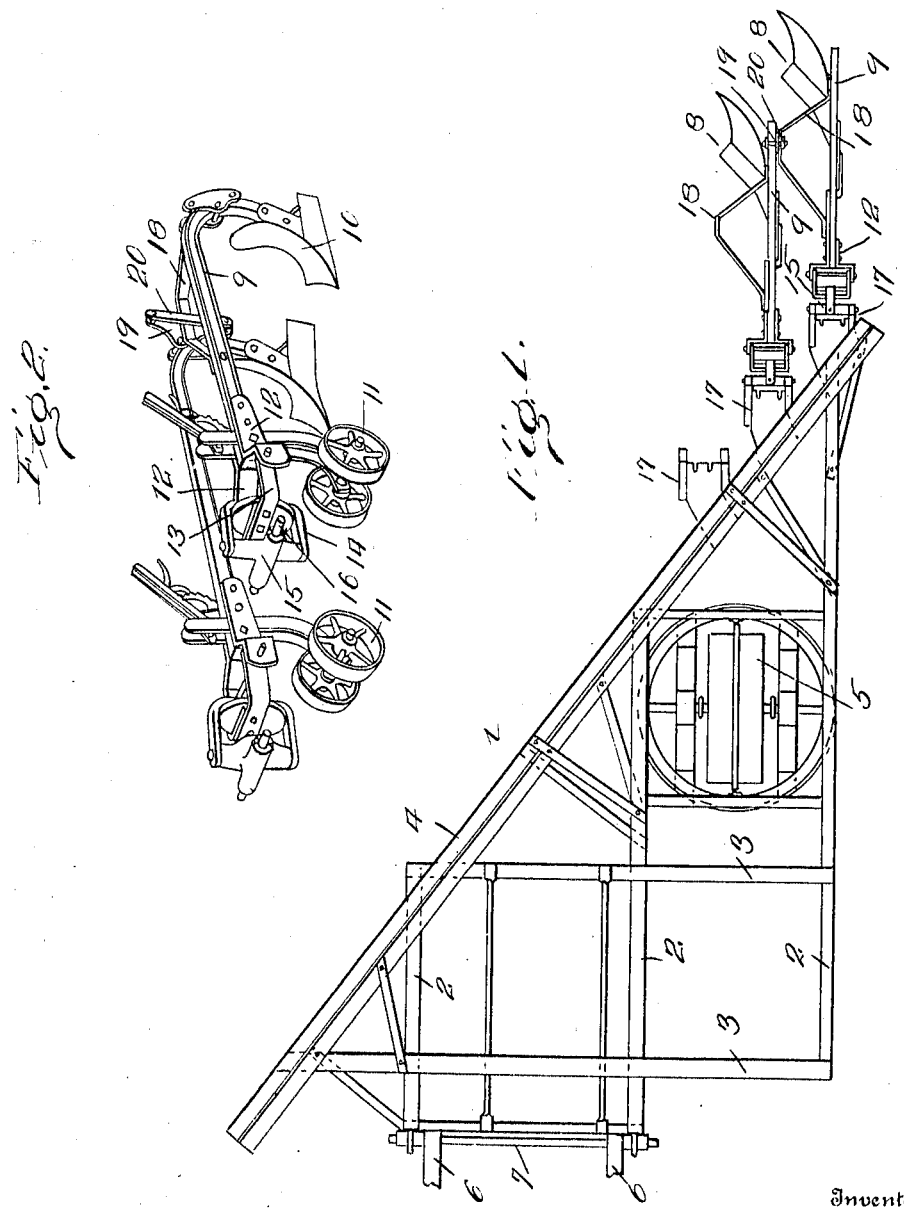
Witnesses
B. E. Brann
R. S. Gehr
Inventor
William N. Springer
By H. H. Bliss
Attorney

UNITED STATES PATENT OFFICE.

WILLIAM N. SPRINGER, OF PEORIA, ILLINOIS, ASSIGNOR TO AVERY COMPANY, A CORPORATION OF ILLINOIS.

STEAM GANG-PLOW.

982,448.      Specification of Letters Patent.      Patented Jan. 24, 1911.

Application filed May 10, 1909. Serial No. 494,953.

*To all whom it may concern:*

Be it known that I, WILLIAM N. SPRINGER, a citizen of the United States, residing at Peoria, in the county of Peoria and State of Illinois, have invented certain new and useful Improvements in Steam Gang-Plows, of which the following is a specification, reference being had therein to the accompanying drawing.
This invention relates to steam gang plows. Plows of this kind, as commonly constructed, comprise a main frame adapted to be hitched to a traction engine and a series or gang of plows flexibly connected to the main frame.

The object of the present invention is to provide improved devices for maintaining the individual plows in proper spaced relation to each other.
Figure 1 is a plan view of a plow embodying my improvements; and Fig. 2 is an enlarged perspective view of two of the individual plows fitted with my improved spacing devices.
In the construction illustrated, 1 designates the main frame of the plow as an entirety. This frame, which may be of any preferred construction as far as my present invention is concerned, is shown as made up of iron bars, suitable structural shapes such as angles and channels being employed, and these bars are bolted or riveted together to form a rigid whole. The main parts of the frame consist of longitudinal bars 2, 2, transverse bars 3, 3, and diagonal bars 4, 4, which constitute a beam to which the plows are hitched. The rear part of the frame is supported by a wheel 5 mounted in suitable bearings.
6, 6 indicate the rear ends of frame members of a traction engine to which the plow frame 1 is pivotally connected by means of the rod 7.

A series of individual plows 8, 8 is suitably connected to the diagonal beam 4 of the main frame, only two of the said series being shown in the drawing. Each plow comprises a beam 9 and a bottom 10. Adjustably mounted gage wheels 11 are mounted on the beam of each plow and each of the plows is coupled to the main frame by suitable flexible connecting devices. These devices, as shown, consist of fork arms 12, 12 rigidly secured to the forward end of the plow beam, a horizontal yoke 13 pivoted to said arms 12 on a transverse axis, a second vertically disposed yoke 14 rigidly secured to the yoke 13, and a cross 15 pivotally mounted in the yoke 14 and carrying a horizontal pivot pin 16 which is adapted to engage the arms of a suitable bracket 17 carried by the main frame 1. The construction of these coupling devices, as well as certain other features of the plows and of the main frame, is fully set forth in my co-pending application, Serial Number 304,855, filed March 8, 1906, to which reference may be had for such details.

It will be seen that the coupling devices employed are such as to permit each individual plow to rise and fall and also to swing laterally. To limit the lateral swinging of the plows, each plow beam carries a spreader 18 which consists preferably of a flat bar bent into V-shape with its ends regidly bolted to the plow beam. This spreader bar is designed to extend to a point adjacent the rear part of the beam of the next plow and by engagement therewith prevents the two plows crowding together. In even mellow soil this spreader bar alone would suffice to maintain the plows in proper relation to each other, but in working uneven stony soil I find that when an individual plow is raised by striking a rock or other obstruction that the spreader bar may be lifted out of engagement with the adjacent plow, permitting the former plow to crowd over upon the latter, which, of course, results in uneven plowing. To obviate this difficulty I provide each plow with a bracket 19 which is rigidly clamped to the rear part of the plow beam. This bracket is preferably in the form of a vertically disposed plate with which the spreader 18 of the adjacent plow can slidably engage. A strap or bar 20 is bolted to the bracket 19 with suitable distance pieces interposed, and thus there is formed in effect a slot in which the spreader bar 18 is slidably mounted.

With this arrangement it is clear that each individual plow is free to rise and fall within certain limits, but as the spreader bar of each plow is unable to escape from lateral engagement with the bracket 19 of the adjacent plow, it is impossible for the plows to crowd upon each other in the manner previously referred to.

What I claim is:

1. In an implement of the character set forth, the combination of a main frame, a series of plows flexibly connected to the frame, means for maintaining each adjacent pair of plows in proper spaced relation to each other comprising a spreader bar rigidly secured to one of the plows, means carried by the other plow forming a vertical slot in which the spreader bar slidably fits, and means for normally preventing the disengaging of the bar from the slot.

2. In an implement of the character set forth, the combination of a main frame, a series of plows flexibly connected to the frame, means for maintaining each adjacent pair of plows in proper spaced relation to each other comprising a spreader bar rigidly secured to one of the plows, and means carried by the other plow forming a vertical slot with which the said spreader bar slidably engages, said slot being closed at its ends whereby in the operation of the plow the spreader bar cannot escape from the slot.

In testimony whereof I affix my signature, in presence of two witnesses.

WILLIAM N. SPRINGER.

Witnesses:
J. L. COLLYER,
E. M. VOORHEES.